Aug. 31, 1965 A. H. FISKE, JR 3,203,226
APPARATUS AND METHOD FOR MEASURING THE
FREEZING POINTS OF LIQUIDS
Filed May 17, 1962 3 Sheets-Sheet 1

INVENTOR.
AUGUSTUS H. FISKE JR.
BY
ATTORNEYS

Aug. 31, 1965　　　A. H. FISKE, JR　　　3,203,226
APPARATUS AND METHOD FOR MEASURING THE
FREEZING POINTS OF LIQUIDS
Filed May 17, 1962　　　　　　　　3 Sheets-Sheet 2

INVENTOR.
AUGUSTUS H. FISKE JR.
BY
Russell, Chittick & Pfund
ATTORNEYS

Aug. 31, 1965   A. H. FISKE, JR   3,203,226
APPARATUS AND METHOD FOR MEASURING THE
FREEZING POINTS OF LIQUIDS
Filed May 17, 1962   3 Sheets-Sheet 3

INVENTOR.
AUGUSTUS H. FISKE JR.
BY
Russell, Chittick & Pfund
ATTORNEYS

United States Patent Office 3,203,226
Patented Aug. 31, 1965

3,203,226
APPARATUS AND METHOD FOR MEASURING THE FREEZING POINTS OF LIQUIDS
Augustus H. Fiske, Jr., Bethel, Conn., assignor to Fiske Associates, Inc., Bethel, Conn., a corporation of Connecticut
Filed May 17, 1962, Ser. No. 195,522
6 Claims. (Cl. 73—17)

This invention relates generally to measuring devices and in particular to an instrument which will accurately measure the total osmotic pressure of fluids by the freezing point method to within $\frac{1}{1000}$ of a degree centigrade and a method for utilizing same.

This instrument is known in the art as an osmometer which is basically a cryoscope capable of being calibrated and which will freeze a sample under closely controlled conditions and record the freezing point depression directly in osmol units. It is an established scientific fact that the freezing point of a solvent is lowered by the addition of solutes and a depression of the freezing point is proportional to the molality of the solution. By utilizing this known scientific principle the degree of concentration of a given solution can be precisely determined if the freezing point can be accurately measured. Therefore since the osmotic pressure of a solution is a function of the concentration of the solution the determination of its freezing point can be established in units of its osmotic pressure. For purposes of this application the unit osmotic pressure is that pressure which is exerted by an aqueous solution whose freezing point is minus 1.858 degrees centigrade.

In medical research and in industry, particularly the dairy industry the variance in concentration of the solution from the normal is of extreme importance. Milk and most other bodily fluids of mammals have been found to have normal freezing points within a range of zero degrees centigrade and minus 1.858 degrees centigrade. Milk, aside from its butterfat component is largely an aqueous solution of various compounds. Consequently the amount of water in normal cow's milk has been found to vary only slightly, and the freezing point of normal milk will fall between minus .540 degrees C. and minus .550 degrees C. Any additional water in the milk, since it lowers the concentration of the solutes, will raise its freezing point. It has been determined that one percent additional water raises the freezing point of milk approximately .0055 degrees C. An individual cow, or even a herd sharing a common sire will show a narrower range of milk freezing points than that indicated for all cows. For instance, a normal single cow's milk freezing point will not vary more than a few thousandths of a degree centigrade over a year's time. Thus, it can be seen the detecting changes in the amount of water in milk requires a more accurate measurement of freezing points than heretofore has normally been possible. Change in freezing points is therefore, a direct function of added water, and butterfat and lactometer tests are not sensitive or reliable enough to determine the added water content.

In medical research, the ability to detect changes from the normal osmotic pressure is useful in detecting disease and other abnormal conditions, such as shock. In this connection, a scale of degrees of osmotic pressure has been established, with one osmol defined as the osmotic pressure exerted by a fluid whose freezing point is minus 1.858 degrees C. Zero osmols is the osmotic pressure of pure water, and it can be seen that one "milliosmol" represents a change in freezing point of .001858 degrees C. Thus, measurement of milliosmols requires the ability to measure freezing points almost to within $\frac{1}{1000}$ of a degree C.

Existing instruments in the field for the determination of freezing points do not have the degree of accuracy required that is essential for medical research and usually involve an extended period of time for the physical measurements involved and a mathematical conversion of the observed readings to true readings. In particular in the Hortvet apparatus and technique of determining milk freezing points, it is necessary to calibrate the apparatus with a distilled water sample and two different standard sucrose solutions for each milk sample tested.

Therefore it is an object of this invention to provide a freezing point determination apparatus and method which will make an accurate determination of the freezing point of a sample to within $\frac{1}{1000}$ of a degree centigrade.

Another object of this invention is to provide an osmometer which will give a direct reading of the true freezing point of a substance directly on a scale without the necessity of using mathematical computations for conversion of observed readings to a true reading.

It is another object of this invention to provide an osmometer which is simple and inexpensive to operate and which will allow the rapid testing of a large number of samples without recalibration.

It is another object of this invention to provide an osmometer which may be simply and readily calibrated.

Other objects of this invention will in part, be obvious, and will in part, appear hereinafter.

Broadly stated one feature of this invention is to provide an osmometer and a method for determining the freezing points of samples by circulating a fluid maintained at a temperature several degrees below the freezing point of the sample to be tested around the sample, remove the temperature gradients within the sample, and to maintain the sample in a metastable state of equilibrium. Upsetting this pseudo state of equilibrium which is rendered unstable by a shock or violent agitation results in a partial freezing of the solution. The temperature of the partially frozen substance may then be determined by utilizing a thermistor inserted in the sample. The thermistor resistance is measured by using it as one arm of Wheatstone bridge and which is directly indicated on a dial which is calibrated in milliosmol units. The process of reducing the temperature several degrees below its freezing point is termed supercooling and it is a feature of my invention that this process can be performed accurately and repeatedly to give uniformity of results. This is of prime importance to the overall accuracy of the measurement of the freezing point. According to the second law of thermodynamics there can be one and only one temperature at which solid and liquid forms of a substance can be in equilibrium. When a solution freezes, only the water portion freezes into ice, and any remaining liquid must necessarily become more concentrated, because the salts cannot be dissolved in ice. So long as there is more than an infinitesimally small portion of ice, a solution with a new degree of concentration will be in equilibrium with the ice, and there will be a different temperature of equilibrium for this mixture of solution and ice. There must be an appreciable amount of ice intermingling with the remaining solution to allow an accurate measurement of its temperature of equilibrium. By accurately and repeatedly supercooling i.e., reducing the temperature of a solution to a point below its freezing point, and mechanically stirring the sample to remove substantially all the temperature gradients therein so that there is an isothermal quality to the sample, the observed degree of supercooling is substantially uniform throughout. By violently agitating the sample or applying a sudden shock from an external source the metastable state is upset, the sample freezes, and the temperature of the remaining concentrated solution is transmitted by a thermistor through the Wheatstone bridge to the galvanometer where direct reading of the osmotic pressure is read off in milliosmols.

To the accomplishment of this and the foregoing related ends, the present invention then consists of the means hereinafter fully described and particularly pointed out in the claims, the annexed drawings and the following description setting forth in detail certain means in the carrying out of the invention, such disclosed means illustrating however but one of the various ways in which the principle in the invention may be employed.

Figure 1:
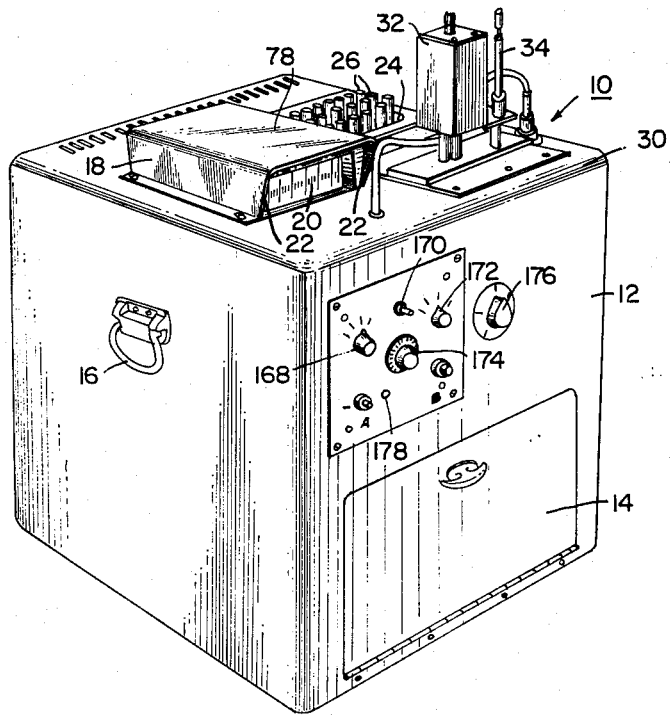
FIG. 1 is a view in perspective of the apparatus embodying the features of this invention.
Figure 2:
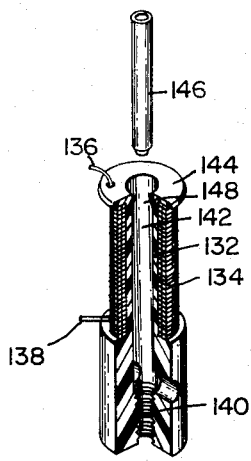
FIG. 2 is a view in elevation partly in section of the solenoid and pellet adapted to apply a shock to the sample.

Reference is now to be had to the drawings wherein an illustrative embodiment of the osmometer, a construcmade in accordance with the present invention and designated by the reference numeral 10 is shown. The osmometer 10 consists primarily of a cabinet 12 having a storage compartment 14 and handle 16 for conveying the cabinet to a working area. Disposed on the upper surface of the cabinet 12 is a raised meter housing 18 having an illuminated dial 20 which is partially recessed within the cabinet with the housing 18 having forwardly extending flanges 22 to protect the dial against inadvertent injury and provide shade for improved viewing of spotlight. A pre-chill bath 24 having a plurality of test tube holders 26 adapted to support in spaced alignment a plurality of test tubes extends within the cabinet from the upper surface of the housing 12 for a purpose to be set forth hereinafter. Adjacent the front edge 30 of the cabinet 12 and mounted on the upper surface thereof is an operational head 32 which is rotatably mounted on a support 34 which extends normal to the top surface of the cabinet 12.

Figures 4, 5:
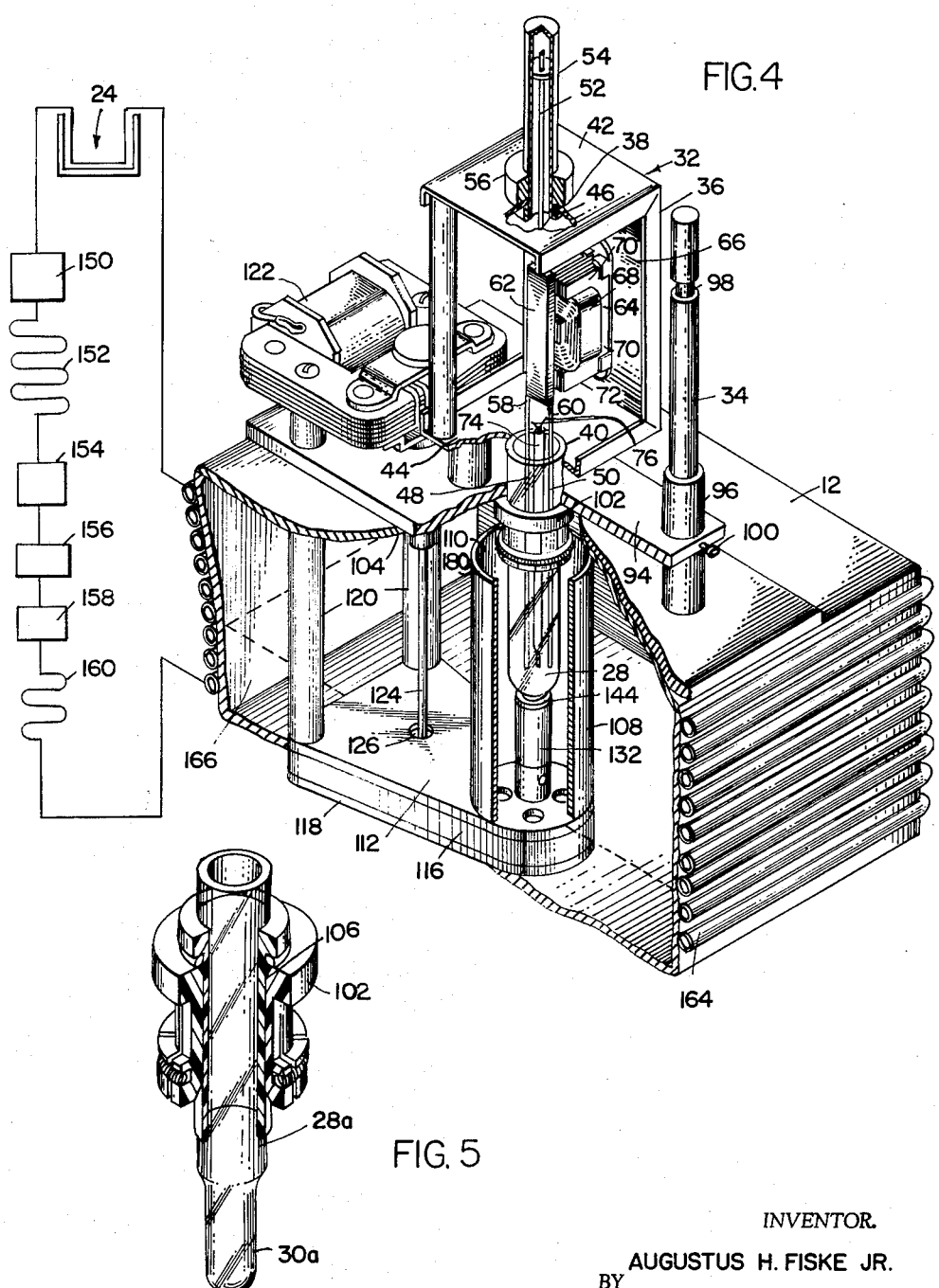
FIG. 4 is a cut-away view of the machine of FIG. 1 illustrating the operation components of the machine and including a schematic of the refrigerant cycle.
FIG. 5 is a view in front elevation partially in section of the collet of FIG. 3 supporting a small sample test tube.

As illustrated in FIG. 4 the operational head 32 comprises a housing 36 having axially aligned apertures 38 and 40 formed in the upper and lower surfaces 42 and 44. Concentrically mounted in the aperture 40 by means of a rubber grommet 46 are a pair of stirring rods 48 and 50 which extend above the upper surface 42 and a considerable distance below the lower surface 44 for a purpose to be set forth hereinafter.

The stirring rods 48 and 50 are held firmly by the rubber grommets 46 so that they act as the nodal points of the rod during a subsequent vibratory motion. A single shaft 52 of the stirring rods extends above the upper surface 42 of the housing 36 and is enclosed within a tubular sheath 54 having a flange 56 which is in abutting relation with the upper surface 42 of the housing to prevent misalignment thereof. The stirring rods 48 and 50 have their ends 58 and 60 connected to an armature 62 which is disposed intermediate the upper and lower surfaces of the housing 36 and laterally spaced from a vibrator 64 which is secured to one lateral wall 66 of the housing 36. The vibrator 64 consists of a coil 68 and a core 70 which are connected through suitable circuitry by leads 72 which are supplied with ½ wave rectified 60 cycle per second alternating current.

Figure 8:
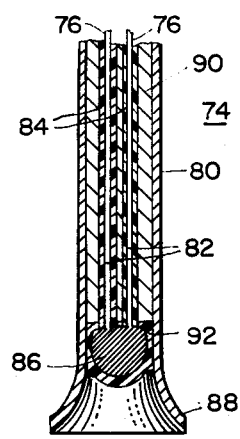
FIG. 8 is a view in section of the thermistor tube.

Also suspended from the operational head 32 and disposed between the stirring rods 48 and 50 is a thermistor 74 which is connected by external leads 76 through suitable circuitry (not shown) and a resistor device such as a Wheatstone bridge to the galvanometer 78. A thermistor 74 as illustrated in FIG. 8 comprises a stainless tube 80 having a pair of platinum wires 82 insulated from each other by Teflon covering or other suitable electrical insulation 84 and joined at the lower end to a bead 86 of thermistor material such as that developed by the Bell Telephone laboratories. The lower end of the stainless tube 80 immediately below the bead 86 is flared outwardly at 88 to increase the heat transfer and to reduce what is known as a probe time constant. The interior of the tube 80 is completely filled with silicone grease 90 whose viscosity does not change over normal temperature ranges i.e., has a low temperature co-efficient and prevents the introduction of air having moisture which if present due to condensation would short the out wires 82. The bead is maintained firmly in position at the lower end of the cryoscope by having an epoxy resin sealing compound 92 therearound which in addition to its sealing property increases the heat transfer from the sample solution inwardly to the thermistor bead 86. It will be seen by referring to FIG. 4 that the entire operational head 32 is attached to the support 34 by means of a bracket 94 having a normally extending guide member 96 which is adapted for axial movement along the support 34 and retention at its raised position by means of a groove 98 adapted to cooperate with a spring loaded locking member 100.

Figure 3:
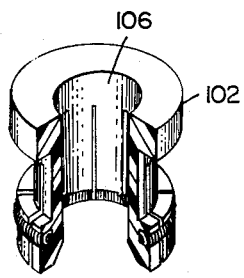
FIG. 3 is a view in elevation partly in section illustrating the supporting collet for the sample.

In FIG. 3 and FIG. 4 there is illustrated a castellated resilient sleeve member 102 which is shown secured to the undersurface 104 of the top surface of the cabinet 12. The sleeve member 102 has an aperture 106 formed therein of slightly less diameter than the external diameter of the test tube 28 but due to the resilient characteristics of the sleeve member and the castellations formed therein it is allowed to expand to hold the test tube member in frictional engagement.

Figure 6:
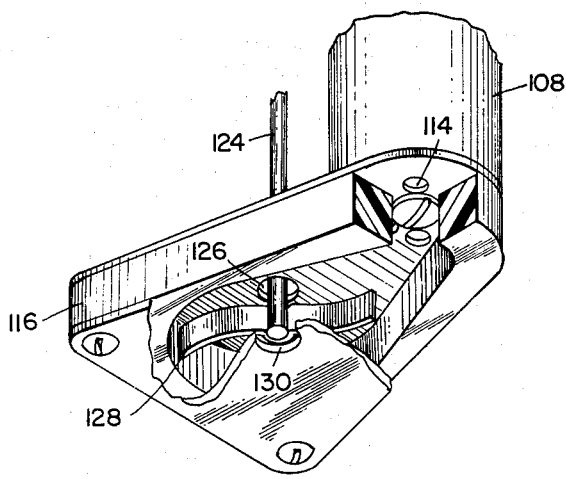
FIG. 6 is a view in perspective partly broken away of the pump cooling mechanism; and, FIG. 7 is a graphic representation of the sequential stages utilized in the determination of the freezing point.

Positioned within the cabinet 12 and in axial alignment with the resilient sleeve member 102 is a cup shaped member 108 which is adjacent the undersurface 104 of the cabinet 12 so as to receive and contain therein in a concentric position a test tube 28 containing a sample. The cup shaped member 108 has a diameter greater than the external diameter of the test tube 28 to allow an air space to exist between the test tube and the interior surface 110 of the cup shaped member. The cup shaped member is normally formed of any good heat conduction material such as copper while the interior surface 110 has a silver coating or other light reflecting material to decrease the radiation outward from the sample. As seen in FIGS. 4 and 6 the cup shaped member 108 is mounted on a base 112 and connected thereto by a centrally located aperture 114. The base 112 has downwardly depending side walls 116 which join and connect thereto a cover member 118, the entire structure defining an enclosed pump housing. The base member 112 is maintained in spaced relationship to the undersurface 104 of the cabinet 12 by means of spacer members 120. Positioned within the cabinet 12 is a pump motor 122 having a downwardly extending drive shaft 124 which passes through an aperture 126 in the upper surface of the base 112 and is connected to an impeller 128 located within the pump housing. The cover member 118 has an aperture 130 formed therein which is in alignment with the drive shaft 124 and acts as a suction manifold for the liquid to be circulated by the impeller and the base 112 has the corresponding aperture 114 which acts as a discharge manifold to the cup shaped member 108.

A hollow non-metallic cylinder 132 is positioned on the base 112 so as to lie concentrically within the cup shaped member 108 and extends upwardly from the base 112 so as to lie spaced from the lower end of the test tube 28. The cylinder 132 has an electrical coil 134 located therein and connected to an external source of power by leads 136 and 138 so as to define a solenoid. Screw threads 140 are formed in the lower portion of the non-metallic cylinder to enable it to be secured to the base member 112. The cylinder 132 has an axially extending aperture 142 formed therein and an upper flange 144. A ferrous pellet 146 is disposed within the axially extending aperture 142 in such a manner as to be acted upon by the energized coil 134 and prevented from passage through the upper end of the aperture 142 by a narrow or restricted area 148.

As can be seen in referring to the schematic diagram included in FIG. 4 the cabinet 12 has a self-contained refrigeration unit comprising a compressor 150, condenser coils 152, a dehydrator 154, filter 156, thermal actuated solenoid 158, and capillary coils 160. This refrigeration system is in turn connected to a series of coils 164 which line the upper interior portion of the cabinet 12 and serve to reduce the temperature of an anti-freeze solution 166 such as ethylene glycol, propylene glycol, isopropyl alcohol or any other suitable solution having a low freezing point. As illustrated in the cutaway portion of the cabinet 12 in FIG. 4 the level of the solution is such that it merely covers the base portion 112 which houses the pump impeller 128 and its operation will be described hereinafter.

The front face of the cabinet 12 contains a plurality of control knobs each having a specific purpose and a plurality of positions which operate through circuitry (not shown) within the cabinet to control in a predetermined sequence components of the device. An operational switch 168 has four positions labeled "off," "1," "2," and "3," a sensitivity switch 170 having high and low positions, a range extender 172 adapted to cover four different ranges, a temperature dial 174 which is calibrated in milliosmols and A and B calibration dials. The calibration dials are adjusted to make the temperature dial 174 direct reading by measuring the freezing point of known test samples. A timing switch 176 may be utilized to automatically actuate an audible warning device at the option of the operator is installed on the cabinet face.

Figure 7:
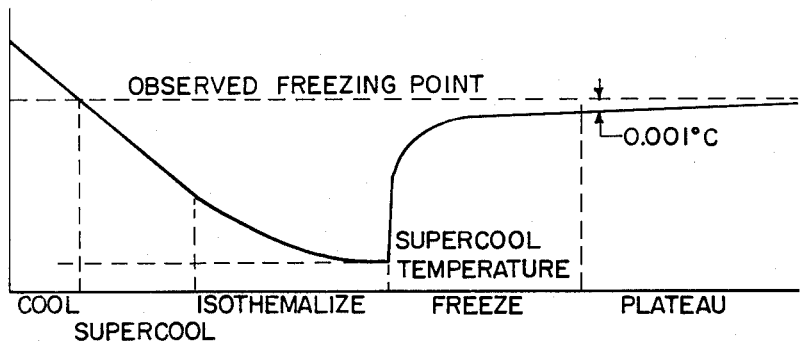

The operation of the device will now be described in view of the above description and the accompanying drawings. The operational head 32 is moved to its stand-by position on the support 34 with a spring loaded locking member 100 engaging the groove 98. The pre-chill bath 24 is filled with approximately 10 ounces of the anti-freeze solution 166 so that it has a depth of about ¾ to 1″. The compressor 150 is switched to its "on" position to start the refrigerant cycling through the unit to reduce the temperature of the anti-freeze solution 166 and the solution within the chill-bath 24. Due to the extreme sensitivity of the galvanometer the compressor 150 is maintained in operation continuously to prevent cycling of the compressor unit and the degree of cooling is regulated by "starving" the compressor for the refrigerant fluid. With a properly charged system the anti-freeze solution 166 located within the cabinet 12 can be maintained at a temperature of approximately 6 degrees below zero centigrade. The test tube holder 26 will accommodate in the neighborhood of 27 test tubes, and each test tube should contain between 2 and 3 milliliters of the fluid such as milk or other body fluids which are placed in the test tube holder 26 so as to pre-chill the sample prior to the actual testing. After the samples have been chilled in the pre-bath to a temperature of approximately zero degrees centigrade or at least considerably below room temperature, an individual test tube is placed in the aperture 106 of the castellated sleeve member and by gentle pressure pushed downwardly until the bottom or curved portion of the test tube comes into contact with the upper flange 144 of the non-metallic cylinnder 132. The test tube 28 containing the sample is then lifted slightly to prevent any thermal contact between the tube and the flange 144. The operational head 32 is then allowed to descend by having the tube 96 released from the groove 98 of the support 34 so that the thermistor 74 and the stirring rods 48 and 50 are positioned within the test tube with the thermistor bead 86 positioned aprroximately at the midpoint of the sample. The sensitivity switch 170 is then shifted from its central position to its low position so that the galvanometer will indicate one degree change in the probe temperature by indicating a one centimeter deflection thereon. The operational switch 168 is then moved from the "off" position to the number "1" position which starts the vibrator 64 which attracts and repels the armature 62 to move the stirring rods 48 and 50 through the solution. An amplitude control 178 is provided on the control panel which consists of a rheostat connected to the vibrator 64 so that the amplitude of vibration of the stirring rods can be controlled to reduce the amount of splashing and to prevent cavitation within the sample. Simultaneously with the actuation of the vibrator 64 and the stirring rods 48 and 50, the pump motor 122 is started which drives the impeller 128 through the drive shaft 124 allowing the anti-freeze solution 166 to pass upwardly through the intake aperture 130 and to be discharged into the cup shaped member 108 by means of the discharge aperture 114. By this operation the anti-freeze solution 166 will circulate upwardly through the cup shaped member 108 to spill over the upper surface 180 thereof and return into the reservoir within the cabinet 12. The continuous circulation of the anti-freeze solution upwardly through the cup shaped member 108 to surround and completely contact the sides of the test tube 28 will have a cooling effect upon the sample contained within the test tube 28. The movement of the stirring rods 48 and 50 move the heat units contained therein outwardly toward the outer edges of the test tube 28 to remove the temperature gradients. It should be understood that there are always temperature gradients present between the sample and the anti-freeze during its cooling period due to the temperature differential between the two. Since the temperature of the anti-freeze solution 166 is several degrees centigrade below the freezing point of the sample, the sample would gradually freeze but for the stirring action of the rods 48 and 50. This stirring action causes the sample to cool down evenly and reduce the temperature gradients in the sample to a minimum. As the heat units within the sample are gradually transferred over to the refrigerant 166 being circulated around the test tube 28 the sample cools below its freezing point without the separation of the solid phase. This physical phenomenon is known as supercooling and establishes a condition known as a metastable equilibrium. This metastable state is defined as the peculiar state of pseudo equilibrium in which the system has acquired energy beyond that for its most stable state yet has not been rendered unstable. The degree of supercooling must be uniform for each sample that is being tested. This is necessary because with increased amounts of supercooling the amount of ice formed in the solution increases consequently the ice that crystallized out is formed at the expense of the solution leaving a more concentrated solution behind. In general not less than 2 degrees of supercooling should ever be used however usually a standard of 3 degrees is established for each of the samples to be tested. Before starting the test the temperature dial is set to the base value of the sample which is its expected freezing point. During the supercooling process the indicator on the galvanometer scale 20 will gradually move to the left showing that the sample is cooling down. As the indicator passes through the midpoint of the scale it indicates that the sample is at its freezing temperature. Consequently the sample in the test tube can be given a predetermined amount of supercooling simply by observing the index line on the galvanometer face. As the supercooling approaches 3 degrees centigrade below zero the operation switch is shifted to its second position which stops the pump motor 122 and allows the anti-freeze solution 166 within the cup-shaped member 108 to drain out into the reservoir within the cabinet 12 while allowing the stiring rods 48 and 50 to continue removing the temperature gradients. The sample within the test tube 28 will isothermalize as the temperature gradients within the sample are being reduced by the stirring rods. Heat transfer virtually ceases with removal of the anti-freeze from the air pocket which exists between the silvered inner surface 110 of the cup-shaped member 108 and the exterior of the test tube 28. As the solution becomes isothermalized by the continuous stirring with no more heat units being removed from the sample, the temperature as indicated on the galvanometer dial will gradually approach the 3 degree supercooling optimum mark. When the index on the galvanometer reaches the 3 degrees of supercooling the operational switch 168 is moved to the third position. At this position the source of energy to the vibrator 64 is shut off and the vibrator rods 48 and 50 remain motionless and simultaneously therewith the leads 136 and 138 convey an impulse to the coil 134 of the non-metallic cylinder which draws the pellet 146 upwardly into contact with the lower end of the test tube 28 and applies a shock thereto. This shock is of sufficient magnitude to upset the metastable equilibrium and causes the sample as a whole to turn into a homogeneous slush. This shock method of freezing has direct advantage over the alternative system of allowing the stirring rod to reach such an amplitude of motion that they strike portions of the support and effect a shock wave. However in some instances the operator may wish to utilize the secondary form of instituting freezing and the electrical circuitry is modified so that upon moving the operational switch 168 to the third position the amplitude switch 178 is by-passed and the stirring rods 48 and 50 vibrate to such an extent that they strike portions of the core 70 and impart a shock wave to the sample resulting in the formation of crystals. This crystallization of ice out of the solution is not an instantaneous process but starts with the formation of an initial crystal or one nuclei which in turn starts a crystal system which has interlocking lattice work structure and becomes locked to the internal walls of the test tube 28 to maintain the sample in a homogeneous state and consequently there is no tendency for the crystal structure to float upwardly to the top surface due to its difference in specific gravity and disturb or establish further temperature gradients within the sample itself. The sensitivity switch 170 is now shifted from low to high to indicate maximum sensitivity in which .005 degrees centigrade change in temperature corresponds to one milliosmol on the dial. Since the time lag of the probe or the time it takes the probe to catch up with the actual temperature of the solution is approximately 45 seconds, a plateau as shown in FIG. 7 is established between the supercool temperature at the freezing point and the time when the reading should be taken. One of the prime characteristics of this type of device is that the thermistor device must be small so that its heat capacity will be low and its speed of response as high as possible. The actual freezing temperature of the solution can then be read by adjusting the temperature dial so that the galvanometer index rests exactly at center zero and a direct reading can be taken off of the temperature dial which will indicate the freezing point in thousandths of a degree centigrade or milliosmol unit. Furthermore any variations from an established base can be read directly off the galvanometer dial by setting the temperature dial to the base value and by reading the millimeter divisions to the right of zero directly in percentage.

Figure 9:
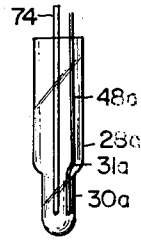
FIG. 9 is a view in front elevation of the modified test tube and stirring rods.

A modified form of this invention is shown in FIGS. 5 and 9 wherein a test tube 28a has a lower portion 30a having a reduced diameter. In the medical research field it is sometimes impractical to obtain enough bodily fluid from the smaller experimental animals, such as a kangaroo rat, to bring the level in the normal sample test tube to a height where the thermistor and the stirring rods can perform effiiciently. However when this modified form of the test tube 28a is used the normal stirring rods 48 and 50 having rigid characteristics cannot be used. Consequently in FIG. 9 there is shown flexible stirring rods 48a which may be simply and easily bent so as to correspond with the bend at the junction 31a connecting the normal diameter of the test tube 28a with the reduced portion 30a. In this manner the modified form of the stirring rods will avoid contact with the interior surface of the test tube 20a and correctly perform its function of removing the temperature gradients within the sample.

Therefore it can be seen that by maintaining a uniformity of supercooling for each sample being tested the degree of concentration of a given solution can be accurately determined and read directly on the scale in units of osmotic pressure.

While there have been described herein what are at present considered preferred embodiments of the invention it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A process for determining the concentration of a substance comprising the steps of placing a measured sample of said substance in liquid form into a container, circulating a cooling medium around said container, said cooling medium having a temperature several degrees lower than a normal freezing point of said substance while simultaneously gently stirring said substance to reduce the temperature gradients therein, supercooling the sample a predetermined number of degrees below its normal freezing point and establishing a metastable liquid state of equilibrium by gently stirring said substance, terminating the circulation of said cooling medium around said container, removing the cooling medium from around said container to form an insulating air pocket therearound, meanwhile continuing the gentle stirring of the sample to isothermalize said sample, imparting a shock from an external source to said container and sample thereby upsetting the metastable state of equilibrium and causing a portion of said substance to freeze, and directly reading the osmotic pressure of said substance.

2. A process for determining the concentration of a substance comprising the steps of placing a measured sample of the said substance in liquid form in a container, circulating a cooling medium around said container, said cooling medium having a temperature several degrees lower than a normal freezing point of said substance while simultaneously gently stirring said substance to reduce the temperature gradients therein, supercooling the sample a predetermined number of degrees below its normal freezing point and establishing a metastable liquid state of equilibrium by gently stirring said substance, terminating the circulation of said cooling medium around said container, removing the cooling medium from around said container to form an insulating air pocket therearound, meanwhile continuing the gentle stirring of the sample to isothermalize said sample, imparting a shock from internal source to said container and sample thereby upsetting the metastable state of equilibrium and causing a portion of said substance to freeze, and directly reading the osmotic pressure of said substance.

3. An apparatus for determining the freezing point of a substance, said apparatus comprising: a test tube containing a measured sample of the substance, said test tube being disposed within a cup-shaped member; a cooling medium having a temperature several degrees lower than the normal freezing point of said substance; a coolant circulating pump having an inlet and an outlet, said outlet being fluidly connected to the bottom of said cup-shaped member whereby said cooling medium enters at the bottom of said cup-shaped member and overflows from the upper peripheral edge thereof into the inlet of said pump; electrically actuated vibratory stirring rods disposed within said test tube; means for varying the vibratory amplitude of said stirring rods; a temperature probe immersed in said sample, said probe producing an output having a characteristic which varies in accordance with changes in temperature; indicating means responsive to the output from said temperature probe, said indicating means being calibrated in osmotic pressure units; means for varying the sensitivity of said indicating means; a solenoid disposed in axial spaced relation at the lower end of said test tube; and switch means to actuate said solenoid thereby imparting a shock to the sample to upset the metastable state of said sample.

4. An apparatus as set forth in claim 3 wherein said stirring rods comprise free-free beams supported in resilient members having their medial lateral portion defining an armature, said armature being actuated upon by coil means disposed in lateral spaced relationship thereto.

5. An apparatus for determining the freezing point of a substance, said apparatus comprising: a test tube containing a measured sample of the substance, said test tube being disposed within a cup-shaped member; a cooling medium having a temperature several degrees lower than the normal freezing point of said substance; a coolant circulating pump having an inlet and an outlet, said outlet being fluidly connected to the bottom of said cup-shaped member whereby said cooling medium enters at the bottom of said cup-shaped member and overflows from the upper peripheral edge thereof into the inlet of said pump; a temperature probe immersed in said sample, said probe producing an output having a characteristic which varies in accordance with changes in temperature; indicating means responsive to the output from said temperature probe, said indicating means being calibrated in osmotic pressure units; means for varying the sensitivity of said indicating means; electrically actuated vibratory stirring rods disposed within said test tube; means for varying the vibratory amplitude of said stirring rods whereby the amplitude of such vibrations can be increased until the stirring rods strike the test tube thereby imparting a shock to the sample to upset the metastable state of said sample.

6. An apparatus as set forth in claim 5 wherein said stirring rods comprise free-free beams supported in resilient members having their medial lateral portion defining an armature, said armature being actuated upon by coil means disposed in lateral spaced relationship thereto.

References Cited by the Examiner

American Instrument Co. Bulletin 2338 (AMINCO) Aug. 1960, 2 pp.

Bowman et al.: J. Lab. & Clin. Med., vol. 43 (1954) pp. 310–315.

Crawford et al.: Journal of Labratory & Clinical Medicine, vol. 40 (1952) pp. 907–913.

RICHARD C. QUEISSER, *Primary Examiner.*

DAVID SCHONBERG, *Examiner.*